United States Patent
Warren

(10) Patent No.: US 9,287,988 B2
(45) Date of Patent: Mar. 15, 2016

(54) OPTICAL COMMUNICATION TECHNIQUES

(75) Inventor: David A Warren, Roseville, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 14/397,422

(22) PCT Filed: May 15, 2012

(86) PCT No.: PCT/US2012/037939
§ 371 (c)(1),
(2), (4) Date: Oct. 27, 2014

(87) PCT Pub. No.: WO2013/172822
PCT Pub. Date: Nov. 21, 2013

(65) Prior Publication Data
US 2015/0086220 A1    Mar. 26, 2015

(51) Int. Cl.
*H04B 10/00* (2013.01)
*H04B 10/50* (2013.01)
*G02B 6/42* (2006.01)

(52) U.S. Cl.
CPC .......... *H04B 10/503* (2013.01); *G02B 6/4286* (2013.01); *G02B 6/4207* (2013.01); *Y10T 29/49826* (2015.01)

(58) Field of Classification Search
CPC ........ H04B 10/40; H04B 10/43; H04B 10/50; H04B 10/07; H04B 10/071; H04B 10/0771; H04B 10/0795; H04B 10/503; H04J 14/0221
USPC ......... 398/135, 136, 137, 138, 139, 200, 201, 398/33, 38, 16, 20, 23, 24, 10, 13, 17, 192, 398/194, 195, 196, 197, 21; 385/89, 90, 92, 385/93
See application file for complete search history.

(56) References Cited

U.S. PATENT DOCUMENTS

| | | | |
|---|---|---|---|
| 5,801,402 A | 9/1998 | Shin | |
| 5,812,581 A | 9/1998 | Cox | |
| 6,547,453 B1 | 4/2003 | Stummer et al. | |
| 6,607,309 B2 | 8/2003 | Kuhn et al. | |
| 6,970,491 B2 | 11/2005 | Bhandarkar | |
| 7,286,581 B2 * | 10/2007 | Coleman | H01L 31/167 257/E31.108 |
| 7,393,145 B1 | 7/2008 | Stevens et al. | |
| 7,400,664 B1 * | 7/2008 | Hattori | H01S 5/0683 372/50.12 |
| 2006/0228078 A1 | 10/2006 | Chan et al. | |
| 2010/0026992 A1 | 2/2010 | Rosiewicz | |
| 2011/0097037 A1 | 4/2011 | Kuznia et al. | |

FOREIGN PATENT DOCUMENTS

JP    02-107939    4/1990

* cited by examiner

*Primary Examiner* — Hanh Phan
(74) *Attorney, Agent, or Firm* — Hewlett Packard Enterprise Patent Department

(57) ABSTRACT

Techniques relating to optical communications are illustrated. In an example, a system for optical communications includes a laser emitting device including an emission surface for emission of a laser beam. An optical waveguide may be optically coupled to the laser emitting device to receive the laser beam from the laser emitting device. A fault photodetector surrounds the emission surface. The fault photodetector is to detect a portion of the laser beam accidentally back-reflected towards the laser emitting device.

18 Claims, 6 Drawing Sheets

OPTICAL COMMUNICATION TECHNIQUES

BACKGROUND

Many applications depend on sending and receiving relatively large amounts of data. Technologies based on transmitting data using light are a convenient option that offers high network bandwidth. (Transmitting data using light is hereinafter referred to as optical communication.) There are a number of devices that use light for transmitting information. For example, optical fibers are capable of transmitting data over vast distances providing high network bandwidth. Photonic integrated circuits (PIC) are another example, in which multiple photonic functions are integrated for providing functionality for light signals.

Some systems for optical communication include a laser emitting device, i.e., a device that, in operation, emits a laser beam that acts as data carrier. For example, the emitted laser light may be modulated for conveying a specific set of data. The laser beam is coupled into an optical waveguide for optically transmitting the data. Vertical-cavity surface-emitting lasers (VCSEL) represent an example of laser emitting devices in optical communication devices. The optical waveguide may be an optical fiber for optical transmission of the data or a portion of a PIC for optical processing of the data.

Reliability of the components in the optical communication system is of great importance to ensure that data can be reliably transmitted. Failure of one of the components in the chain of optical links may compromise the whole system.

BRIEF DESCRIPTION OF THE DRAWINGS

In order that the present disclosure may be well understood, various examples will now be described with reference to the following drawings.

DETAILED DESCRIPTION

Figure 1A:
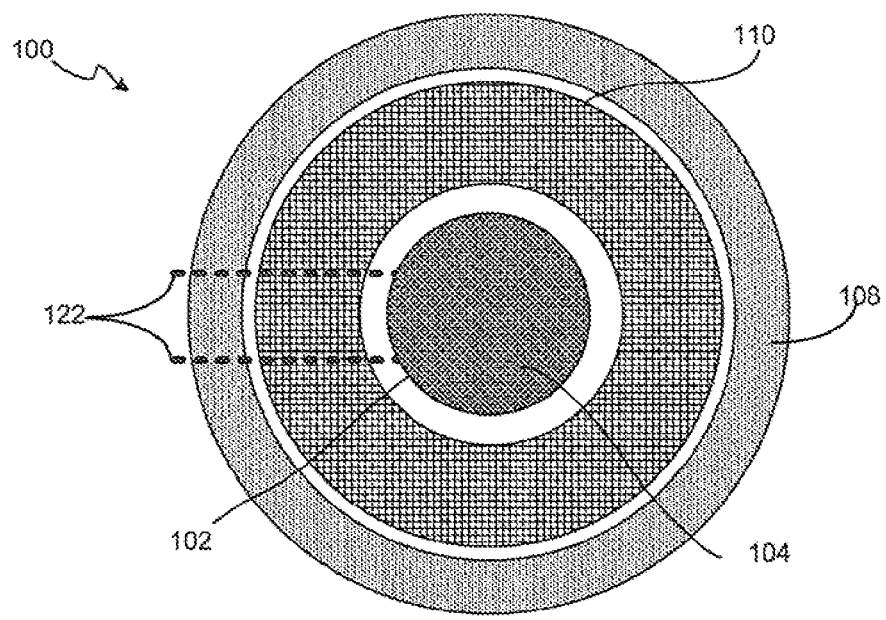
FIG. 1A schematically shows a lateral cross section of a system for optical communication according to an example.

In the following description, numerous details are set forth to provide an understanding of the examples disclosed herein. However, it will be understood by those skilled in the art that the examples may be practiced without these details. Further, in the following detailed description, reference is made to the accompanying figures, in which various examples are shown by way of illustration. In this regard, directional terminology, such as "top," "bottom," "front," "back," "left," "right," "vertical," etc., is used with reference to the orientation of the figures being described. Because disclosed components can be positioned in a number of different orientations, the directional terminology is used for purposes of illustration and is in no way limiting. Like numerals are used for like and corresponding parts of the various figures.

As set forth above, reliability of the components in the optical communication system is of great importance to ensure that data can be reliably transmitted. Failure of one of the components in the chain of optical links may compromise the whole system.

A defective optical coupling in an optical communication system may compromise optical communication. In particular, a defective optical coupling may cause that a portion of the laser beam emitted by a laser emitting devices is accidentally back-reflected from the optical waveguide towards the laser emitting device. Defective optical couplings may include, but not limited to, optical misalignments between the laser emitting device and the optical waveguide, as well as degradations of an optical link somewhere in an optical communication chain; the optical link may be at the optical waveguide, downstream of the optical waveguide (e.g., in a further communication elements), or upstream of the optical waveguide (e.g., at a coupling element such as a lens). Optical link degradation may be caused, for example, by contamination such as dust or humidity, thermal movement of components, or fractured terminations. Unwanted reflected light may accidentally modulate laser current causing an immediate reduction in output power of the laser emitting device. Moreover, it may cause longer term degradation that may compromise the operating lifetime of the light emitting device.

Various examples described below facilitate mitigating the effect of such unwanted back-reflections. In at least some of the following examples, a fault photo-detector is disposed surrounding the emission surface of the laser emitting device; the fault photo-detector is configured to detect light accidentally back-reflected from the optical waveguide towards the laser emitting device. A fault photo-detector disposed surrounding the emission surface of the laser emitting device represents a convenient geometry for detecting accidental back-reflections, as further illustrated below.

According to some examples, an optical waveguide includes an optical fiber. However, it will be understood that an optical waveguide is not limited to an optical fiber: an optical waveguide as referred to herein is intended to encompass any physical structure suitable for guiding electromagnetic waves in the optical spectrum and, more specifically, to receive and guide light emitted by a laser emitting device, such as, but not limited to, a vertical cavity surface emitting laser (VCSEL).

During operation of an optical communication system according to at least some examples herein, the signal generated by the fault photo-detector at a normal condition of the system (i.e., without suffering from a fault causing accidental back-reflections) is relatively low and may correspond to a quiescent level. (The quiescent level may be determined, for example, by calibration of the system upon manufacturing, as further described below). If the system suffers from a fault condition, a portion of the laser beam may be accidentally back-reflected from the optical waveguide towards the laser emitting device. This fault condition is reflected in the signal generated by the fault photo-detector. For example, a fault condition may be detected when the signal generated by the fault photo-detector is higher than a quiescent level.

As used herein, a portion of the laser beam accidentally back-reflected refers to light non-purposively reflected back towards the laser emitting device. It should be noted that some optical systems are configured to purposively reflect light towards a monitoring photo-detector to monitor output of a laser emitting device. However, such monitoring photo-detectors implement a different function than a fault photo-detector as described herein: monitoring photo-detectors are not configured to detect a fault condition of the system by generating a signal that is suitable for identifying a portion of the laser beam accidentally back-reflected towards the laser emitting device.

In at least some examples, the laser emitting device includes a vertical cavity surface emitting laser (VCSEL). However, it will be understood that the present disclosure is not limited to laser emitting devices including VCSELs. A laser emitting device as used herein may include any structure for generating a laser beam suitable for data communication, in particular, a modulated laser beam.

VCSEL technology facilitates optical links to be implemented at costs approaching electrical implementations. However, quality issues need to be considered in order to facilitate that low-cost optical links completely eliminate electrical solutions. Low-cost optical links may be particularly prone to suffer unwanted back-reflections. Therefore, at least some of the examples disclosed herein are suitable for facilitating overcoming quality issues in optical communication systems implementing low-cost elements.

Figure 1B:
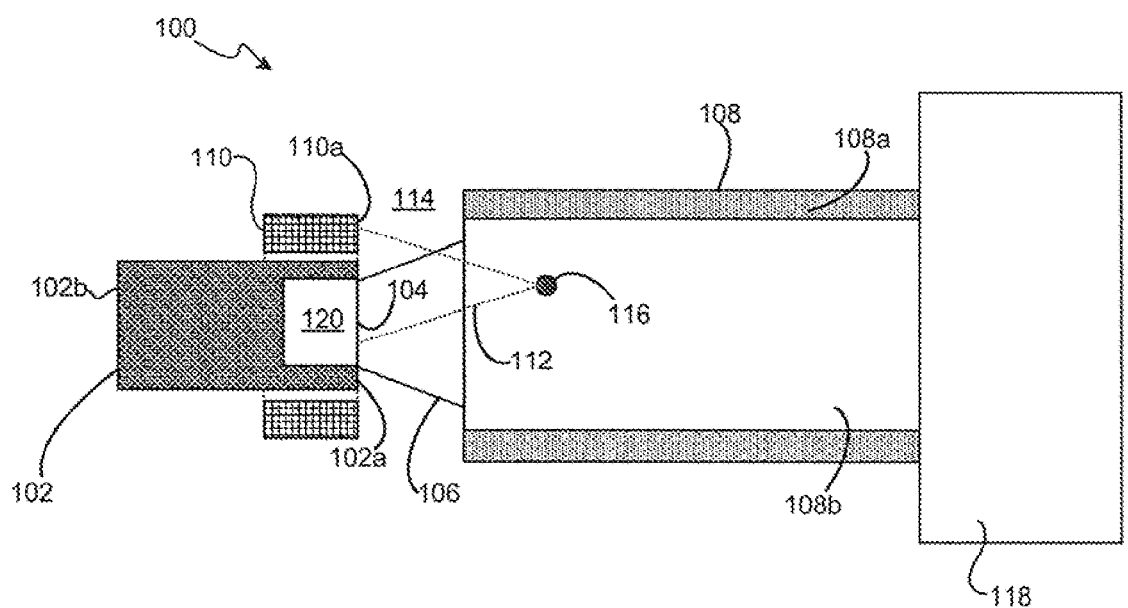
FIG. 1B schematically shows a longitudinal cross section of the system of FIG. 1A.

FIGS. 1A and 1B depicts an example of a system 100 for optical communication. FIG. 1A shows a lateral cross section of system 100; FIG. 1B shows a longitudinal cross section of system 100.

System 100 includes a laser emitting device 102. Laser emitting device 102 includes an emission surface 104 for emission of a laser beam 106, which is shown in FIG. 1B. System 100 further includes an optical waveguide 108 to receive laser beam 106 from laser emitting device 102. System 100 further includes a fault photo-detector 110 surrounding emission surface 104. Fault photo-detector 110 is to detect a portion 112 of the laser beam, which portion 112 is accidentally back-reflected from the optical waveguide towards the laser emitting device (portion 112 is hereinafter also referred to as accidental back-reflection 112). The exemplary system also includes electrical connections 122 for electrically operating laser emitting device 102.

In the exemplary embodiment, optical waveguide 108 is mechanically and optically coupled to an optical link 118. Optical link 118 may be any suitable structure for connecting system 100 to an optical communication system that optically transmits data. Optical link 118 may be an optical connector tailored for a specific application of system 100.

In the exemplary embodiment, laser emitting device 102 includes a vertical cavity surface emitting laser (VCSEL 120) for emitting laser light for optical communication. VCSEL 120 may be configured to emit laser light particularly suitable for a particular application of system 100 such as, but not limited to, laser light with a laser emission frequency of 850 nm or 949 nm. It will be understood that different VCSEL wavelengths may used depending on the particular application; the present disclosure is not limited to any specific laser wavelength. A VCSEL is a type of semiconductor laser diode with laser beam emission perpendicular from the top surface, contrary to conventional edge-emitting semiconductor lasers (also known as in-plane lasers). Since VCSELs can be conveniently manufactured with controlled yield as well as predictable outcome, they facilitate reliable optical communication at a relatively low-cost.

Optical waveguide 108 is optically coupled to laser emitting device 102. In other words, system 100 is configured such that optical waveguide 108 receives a laser beam emitted from laser emitting device 102, when laser emitting device 102 is being operated. In the exemplary system, laser emitting device 102 includes two distal ends 102a, 102b. Distal end 102b is disposed in front of optical waveguide 108. Emission surface 104 is disposed at distal end 102b, so that laser beam 106 from laser emitting device 102 is optically coupled into optical waveguide 108. Laser emitting device 102 may be coupled to a modulating unit (e.g., a unit included in laser controller 322 depicted in FIG. 4) for modulating laser beam 106 in a manner such that data can be optically transmitted into optical link 118.

In the exemplary system, laser emitting device 102 is directly coupled to optical waveguide 108, i.e., laser beam 106 is transmitted in free space 114 between laser emitting device 102 and optical waveguide 108. It will be understood that laser emitting device 102 may be indirectly coupled into optical waveguide 108, i.e. using optical coupling elements such as lenses (as illustrated below with respect to FIG. 2) or any suitable transparent or semi-transparent medium (not shown). It is noted that such optical coupling elements also constitute an optical waveguide, and that a fault photo-detector as described herein may be to detect accidental back-reflections caused by such optical coupling elements.

In the example of FIGS. 1A and 18B, optical waveguide 108 is an optical fiber including a core 108b surrounded by a cladding layer 108a. The optical fiber may be a multiple core optical fiber (not shown). In the latter example, the optical fiber may receive a plurality of laser beams from multiple laser emitting devices, each laser emitting device being optically coupled to one or more corresponding core. It will be understood that an optical fiber may include further elements such as, but not limited to, a buffer and jacket. Such additional elements of an optical fiber are omitted in the figures for the sake of simplicity. Optical waveguide 108 may be a single-mode fiber or a multi-mode fiber. Optical waveguide 108 may form part of an optical fiber cable (not shown) including one or more optical fibers. In the latter case, each optical fiber may be coupled to a laser emitting device, similarly as depicted in the Figures herein for one optical fiber. Downstream of the depicted system, optical waveguide 108 may be coupled to other optical elements such as downstream connectors or splitters, which are omitted from the Figures for the sake of simplicity.

As set forth above, fault photo-detector 110 is configured to detect accidental back-reflection 112. More specifically, fault photo-detector 110 is disposed surrounding emission surface 104 to generate a signal output in response to light accidentally back-reflected towards laser emitting device 102; when laser emitting device 102 is not being operated, fault photo-detector 110 may detect either no light or a substantially constant background light level. The constant background light level may correspond to light in the surroundings of system 100. The constant background light level may be characterized by measuring the signal level generated by fault photo-detector 110 when laser emitting device 102 is not being operated.

Fault photo-detector 110 may be configured to minimize the signal level responding to operation of laser emitting device 102, when no anomaly causes an accidental light back-reflection in system 100. For example, fault photo-detector 110 and other components of system 100 may be spatially configured such that, at a normal condition of the system, there is no signal level increase caused by laser beam 106 or such a signal level increase is sufficiently low and does not interfere with detection of accidental back-reflections. For example, a signal level increase caused by laser beam 106 may be lower than the quiescent level described below. More specifically, the quiescent level may be pre-selected to be sufficiently high, so that a "normal" signal level increase caused by laser beam 106 is not associated with a fault condition of the system.

Fault photo-detector 110 may be constituted by any type of photo-detector capable of generating an electrical signal in response of an accidental back-reflection impinging on a detecting surface of fault photo-detector 110a. In the example depicted in FIGS. 1A and 1B, fault photo-detector 110 is constituted by an annular photodiode arrangement surrounding laser emitting device 102. In other examples, fault photo-detector 110 and laser emitting device 102 are built on a common substrate.

More specifically, a fault photo-detector and a laser emitting device may be manufactured on a common substrate with the fault photo-detector configured to detect accidental back-reflections of light emitted from the laser emitting device. For example, a semiconducting substrate may be manufactured with tailored layers for implementing the laser emission functions of the laser emitting device. For example, such a structure may include a bottom mirror layer and a top mirror layer with an active layer sandwiched between both layers; a contact layer and a photodetector layer may be disposed on the top mirror. An analogous structure for monitoring light intensity of a laser is described in U.S. Pat. No. 5,812,581. According to examples herein, contact pads may be disposed on the photodiode layer for defining a detecting surface surrounding an emission surface. The system is configured then such that the detecting surface is for detection of a portion of the laser beam accidentally back-reflected from the optical waveguide towards the laser emitting device (e.g., no portion of the laser beam is purposively directed towards the detecting surface).

It is noted that the detecting surface of a fault photo-detector as described herein is configured to detect accidental back-reflections and not laser light purposively directed to the photo-diode. The latter function is implemented, for example, by a photodetector configured as described in U.S. Pat. No. 5,812,581 or the monitoring photo-detector of FIG. 2. It is also noted that a monitoring photo-detector may indirectly respond to accidental back-reflections. However, since a monitoring photo-detector constantly receives a direct beam input from the laser emitting device, it is generally impossible or difficult to distinguish current deltas caused by accidental back-reflections from variations on the laser current. In contrast thereto, a fault photo-diode as described herein facilitates detection of accidental back-reflections using a simple current measurement, since the fault photo-diode is configured to detect accidental back-reflections and not purposively reflected portions of the laser beam emitted by the laser emitting device. Moreover, since the fault photo-diode is disposed surrounded the emission surface of the laser device, it is facilitated to detect accidental back-reflections that may affect the light output of the system or even damage the laser emitting device. Moreover, no further optical elements are in principle required for detecting the accidental back-reflections.

A fault photo-detector as described herein may be chosen with a spectral response tailored to the frequency of light emitted from laser emitting device. More specifically, the spectral response of fault photo-detector 110 may be such that the response of fault photo-detector 110 to light at the emission frequency of laser emitting device 102 is particularly high. In particular, the spectral response of fault photo-detector 110 may be a narrow window centered at the emission frequency of laser emitting device 102. Thereby, it is facilitated that responsiveness of fault photo-detector 110 to accidental back-reflections is not impaired by light from other sources.

FIG. 1B depicts a fault condition of system 100 caused by a defect 116 at core 108b of optical fiber 108. Defect 116 may be caused by, for example, a fracture at a particular location of core 108b. Fault photo-detector 110 converts accidental back-reflection 112 into a corresponding electrical signal, which may be transmitted, either as a processed or as a raw signal, to a fault detection module (shown in FIG. 4) to detect a fault condition of the system. Other causes for back-reflections include, but are not limited to, contamination such as dust and humidity in any portion of system 100 or of an optical system coupled thereto. Further, accidental back-reflection 112 may be caused by defects or misalignments at optical elements disposed downstream of the depicted system.

Figure 2:
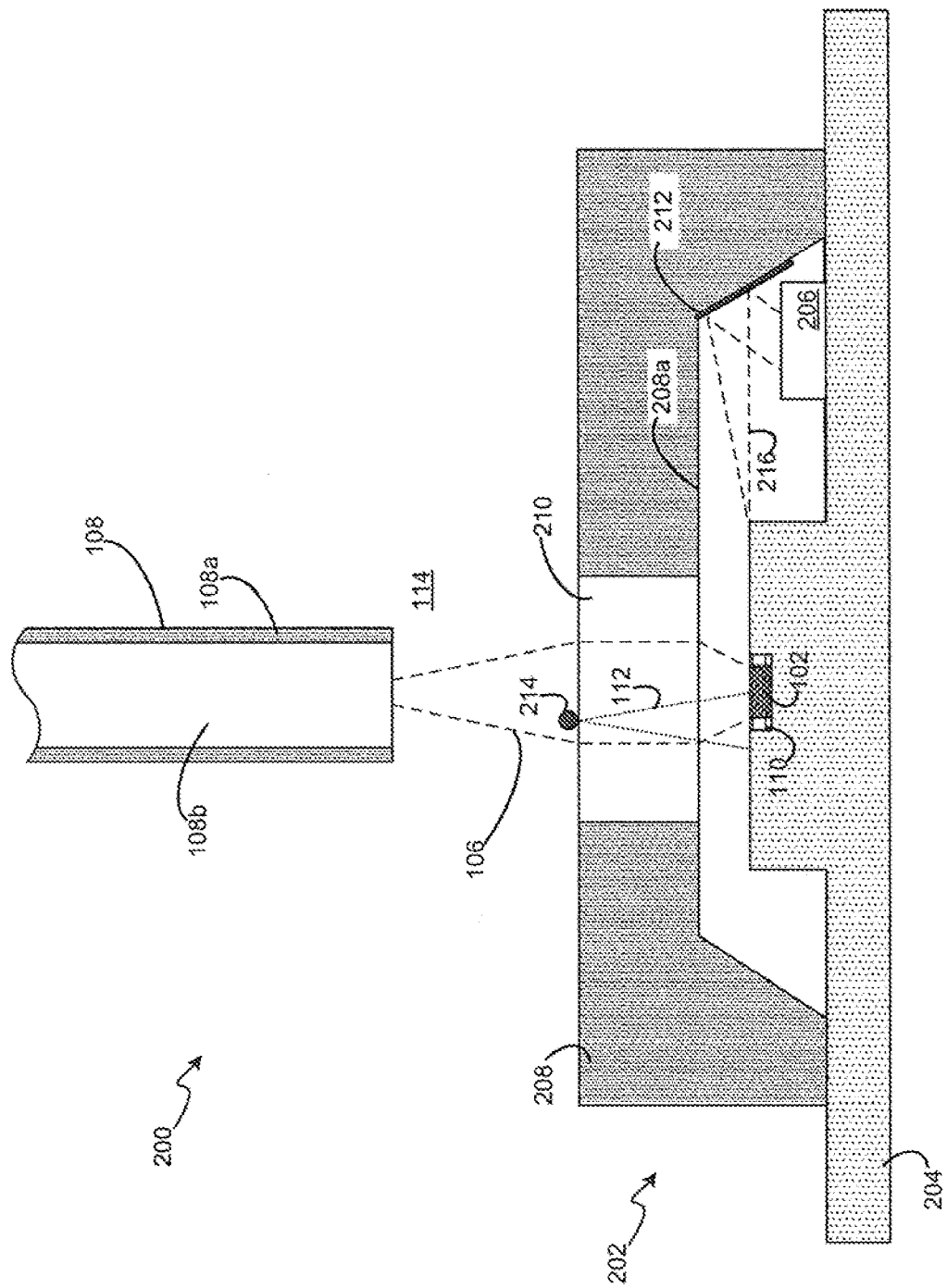
FIG. 2 schematically shows a cross-section of a system for optical communication according to another example.

FIG. 2 schematically shows a cross-section of a system 200 for optical communication according to another example. System 200 includes a planar packaging 202 of a surface emitting laser and a coupling waveguide. As illustrated in the Figure, in this example, laser emitting device 102 and fault photo-detector 110 are formed on a common substrate 204. Substrate 204 may be formed with conductive lines and pads (not shown) for providing electrical connections from inside packaging assembly 202 to outside packaging assembly 202 and beneath the surface of substrate 204. Substrate 204 may be a semiconductor material, such as silicon. In the exemplary system, laser emitting device 102 and fault photo-detector 110 are formed in substrate 204. Laser emitting device 102 and fault photo-detector 110 may be formed in substrate 204 using semiconductor manufacturing techniques as described above. In other examples, laser emitting device 102 and fault photo-detector 110 may be manufactured independently and attached on substrate 204 such that laser emitting device 102 and fault photo-detector 110 are operable through the conductive lines and pads provided in substrate 204 and packaging 202.

In the exemplary system, a monitoring photodiode 206 is provided on top of substrate 204 at a location near to laser emitting device 102 such that output of laser emitting device 102 is monitorable. More specifically, monitoring photodiode 206 is a photo-diode with a geometry and location suitable for generating a signal output in response to light impinging of the photo-sensitive surface of the photo-diode. It will be understood that the placement and configuration of monitoring photodiode 206 depicted in FIG. 2 is merely an example; there is a variety of ways for configuring a monitoring photo-detector. Generally, monitoring photodiode 206 is optically aligned with other optical elements for purposively coupling thereto a portion of laser light emitted by laser emitting device 102, e.g. a reflective element 212, which is further described below.

Laser emitting device 102, fault photo-detector 110, and monitoring photodiode 206 are encapsulated by a housing 208. Housing 208 may be completely or partially transparent. In this example, housing 208 hermetically encapsulates the depicted active elements for preventing that contamination interferes with operation of system 200. For that reason, housing 208 may be attached to substrate 204 using sealing elements (not shown) at the joint between housing 208 and substrate 204. Housing 208 may be formed using molding or semiconductor processing techniques. For example, housing 208 may be formed on a silicon substrate using known gray-scale masking techniques.

In this example, housing 208 includes a lens 210. A beam 106 of light emitted by laser emitting device 102 is directed towards lens 210 for optical transmission of data. Lens 210 is configured for transmitting, shaping, and coupling beam 106 into optical waveguide 108. In the depicted example, lens 210 integrated in housing 208 and formed on a central portion thereof. In other alternative examples, lens 210 may be provided as a modular element attached on housing 208 at a location such that lens 210 can optically guide laser beam 106 into optical waveguide 108. The inner surface of lens 210 may be provided with an anti-reflective coating (not shown) for preventing optical losses in laser beam 106.

In the example of FIG. 2, a portion 216 of the light emitted by laser emitting device 102 is laterally emitted to monitor output of laser emitting device 102. In the illustrated example, an inside surface 208a of housing 208 is provided with a reflective coating 212 to direct monitoring laser portion 216 into monitoring photodiode 206, so that a monitoring signal can be generated. Using a monitoring signal to control output of laser emitting device 102 is further illustrated below with respect to FIG. 3. It will be understood that the specific configuration of a monitoring photo-diode and the system containing it described above for monitoring laser output is merely illustrative. There is a variety of manners suitable for configuring a monitoring photo-detector and elements in the system (e.g., reflectors for deviating a monitoring light portion) to monitor output of a laser emitting device.

FIG. 2 illustrates system 200 operating under a fault condition. More specifically, FIG. 2 illustrates how an accidental back-reflection 112 is caused by a contaminating element 214 (e.g., a dust particle). Contaminating element 214 causes that fault photo-detector 110 detects (e.g., generates an abnormally high signal level) that a portion 112 of the laser beam is being accidentally back-reflected towards laser emitting device 102. Since no light from laser emitting device 102 is purposively directed towards fault photo-detector 110, system 200 is capable of distinguishing that an abnormally high signal level generated corresponds to an accidental back-reflection and not to fluctuations of laser output (which might be reflected in the signal level generated by monitoring photodiode 206).

Figure 3:
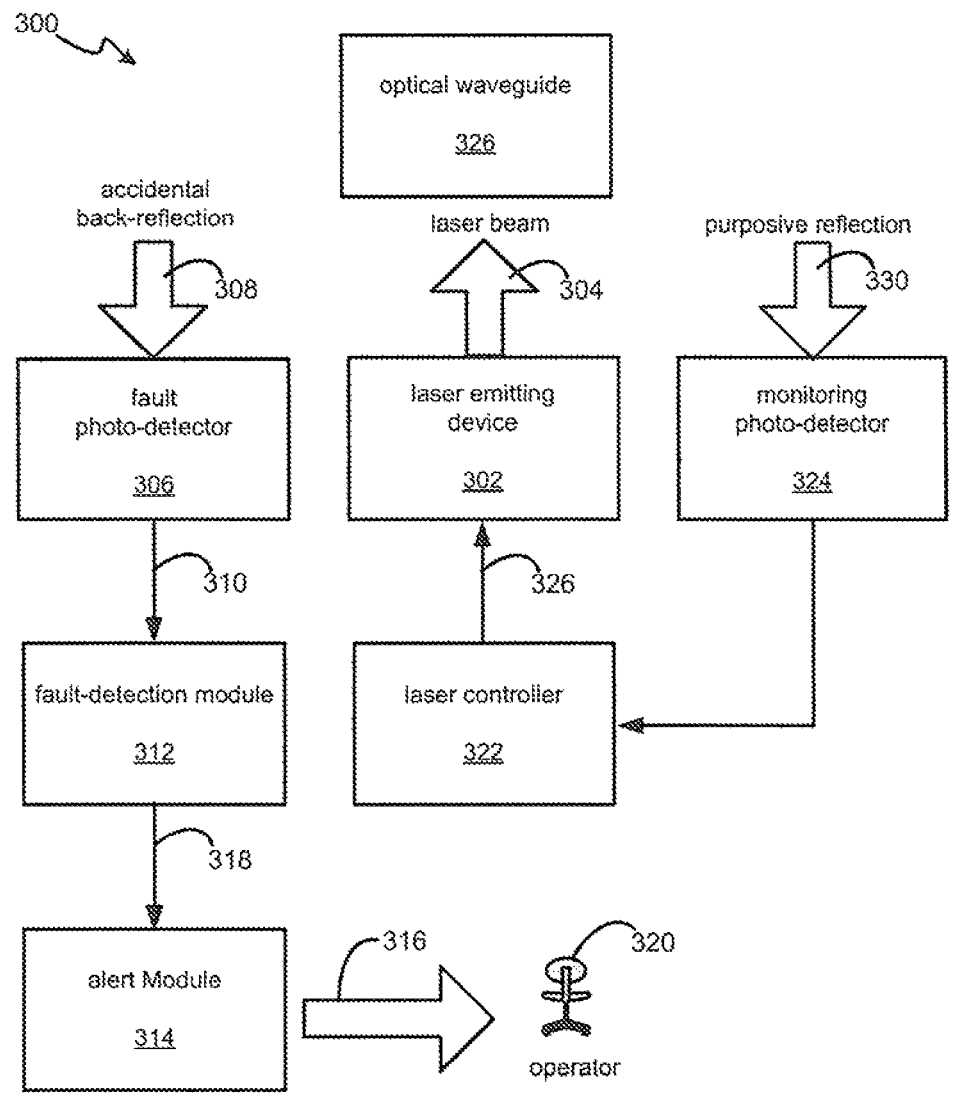
FIG. 3 illustrates as a block diagram another example of a system for optical communication.

FIG. 3 illustrates as a block diagram another example of a system 300 for optical communication. System 300 includes a laser emitting device 302. Laser emitting device 302 may be constituted and configured as illustrated above with respect to FIGS. 1A to 2. More specifically, laser emitting device 302 may include an emission surface for emission of a laser beam into an optical waveguide 326. Optical waveguide 326 may be constituted and configured as illustrated above with respect to FIGS. 1A to 2.

System 300 further includes a fault photo-detector 306. Fault photo-detector 306 may be constituted and configured as illustrated above with respect to FIGS. 1A to 2. More specifically, fault photo-detector 306 surrounds an emission surface of laser emitting device 302 to generate a signal output 310 in response to light 308 accidentally back-reflected towards the laser emitting device.

System 300 may further include a fault detection module 312 communicatively connected to fault photo-detector 306 (e.g., through a suitable electrical connection) to detect a fault condition of the system on the basis of signal output 310 of fault photo-detector 306.

According to some examples herein a fault condition may include at least one of i) an optical misalignment between the laser emitting device and the optical waveguide, or ii) a degradation of an optical link. Optical misalignment may appear due to a change of the relative position between the laser emitting device and the optical waveguide. Such changes may be caused by, for example, mechanical strains acting on the system or temperature variations that influence mechanical dimensions of components in the system. Optical link degradation refers to a loss of quality in one or more elements inside or outside the communication systems that causes an unwanted scattering of laser light. Such degradation may be caused by a mechanical defect in a component of the optical system (as illustrated with respect to FIGS. 1A and 1B) or contamination in the optical system (as illustrated with respect to FIG. 2). It is noted that the fault condition may be caused at any portion of an optical communication chain in which any of the systems illustrated herein is coupled to engender the optical data signal. In other words, the cause of an accidental back-reflections as referred herein may be located somewhere in the whole communications chain and not only in the part of the system responsible for generating and coupling the laser beam, as illustrated with respect to FIGS. 1A to 3.

In the exemplary system, a laser controller 322 is provided for controlling the output of laser emitting device 302. Laser controller 322 may be responsible of modulating the output of laser emitting device 302 such that laser beam 304 carries a data signal. Laser controller 322 may be coupled to additional modules that provide the data to be coupled to system 300.

System 300 further includes an alert module 314 to generate an alert signal 316 on the basis of signal output 310 of fault photo-detector 306. In particular, alert module 314 may be communicatively coupled to fault detection module 312 for receiving a signal 318 confirming that a fault condition exists. Upon receiving a fault condition signal 318, alert module 314 may generate an alert signal 316. Alert signal 316 may be transmitted to an operator 320 in charge of the optical communication system. Alternatively, or in addition thereto, alert signal 316 may be used by further automating modules for triggering a pre-determined action, such as turning-off data transmission through laser emitting device 302 for preventing damages in the system or a checking procedure for determining the cause of the fault condition. Time delay between laser emission by laser emitting device 302 and detection of a corresponding accidental back-reflection 308 at fault photo-detector 306 may be used to determine where a fault is located. The strength of accidental back-reflection 308 can be used to determine the nature of the fault.

Examples of systems herein may be configured to, once a fault condition is detected, operating with a specific modulation the laser emitting device to confirm whether a signal output of the fault photo-detector corresponds to light from laser emitting device accidentally back-reflected towards the laser emitting device. For example, alert signal 316 may be correlated to the modulation of laser emitting device 302 for further confirmation of a reflected signal. If an alert is generated, a specific modulation may be implemented in laser emitting device 302. If the detected signal by the fault photo-detector correlates with the specific modulation, this might be an indication that the detected accidental back-reflection is in fact a back-reflection caused from back-reflection of light emitted by laser emitting device 302. In other words, an unwanted reflected power detected by fault photo-detector 306 should correlate to the modulation pattern.

Further, system 300 may provide a laser controller 322 for controlling the intensity of light emitted from laser emitting device 302. For implementing this function, laser controller 322 may collaborate with a monitoring photo-detector 324 for generating a control signal 326. Laser emitting device 302 may be constituted and configured as illustrated above with respect to FIG. 2. A monitoring signal 326 is generated in response to some light 330 deviated on purpose from laser emitting device 302 towards 324 as illustrated above with respect to FIG. 2. Monitoring signal 326 is fed into laser emitting device 302 for controlling the output of laser emitting device 302. In other words, laser controller 322 implements a feedback mechanism for controlling laser output.

Specific details of such a feedback mechanism are described, for example, in U.S. Pat. No. 5,285,466.

It will be appreciated that the modules depicted in FIG. 3 and illustrated above can be realized in the form of hardware modules, software modules or a combination of hardware and software modules. Further, the functionality of two or more modules may be combined in one module. Further, the functionality of one module may implemented by two or more sub-modules. The modules may be implemented integrally in a single computing system. Alternatively, the modules may be implemented distributed over multiple computing systems.

Any such software module, which includes machine-readable instructions, may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of a non-transitory computer-readable storage medium that are suitable for storing a program or programs that, when executed, for example by a processor, implement embodiments. Accordingly, embodiments provide a program comprising code for implementing a system or method as claimed in any preceding claim and a non-transitory computer readable storage medium storing such a program.

Figure 4:
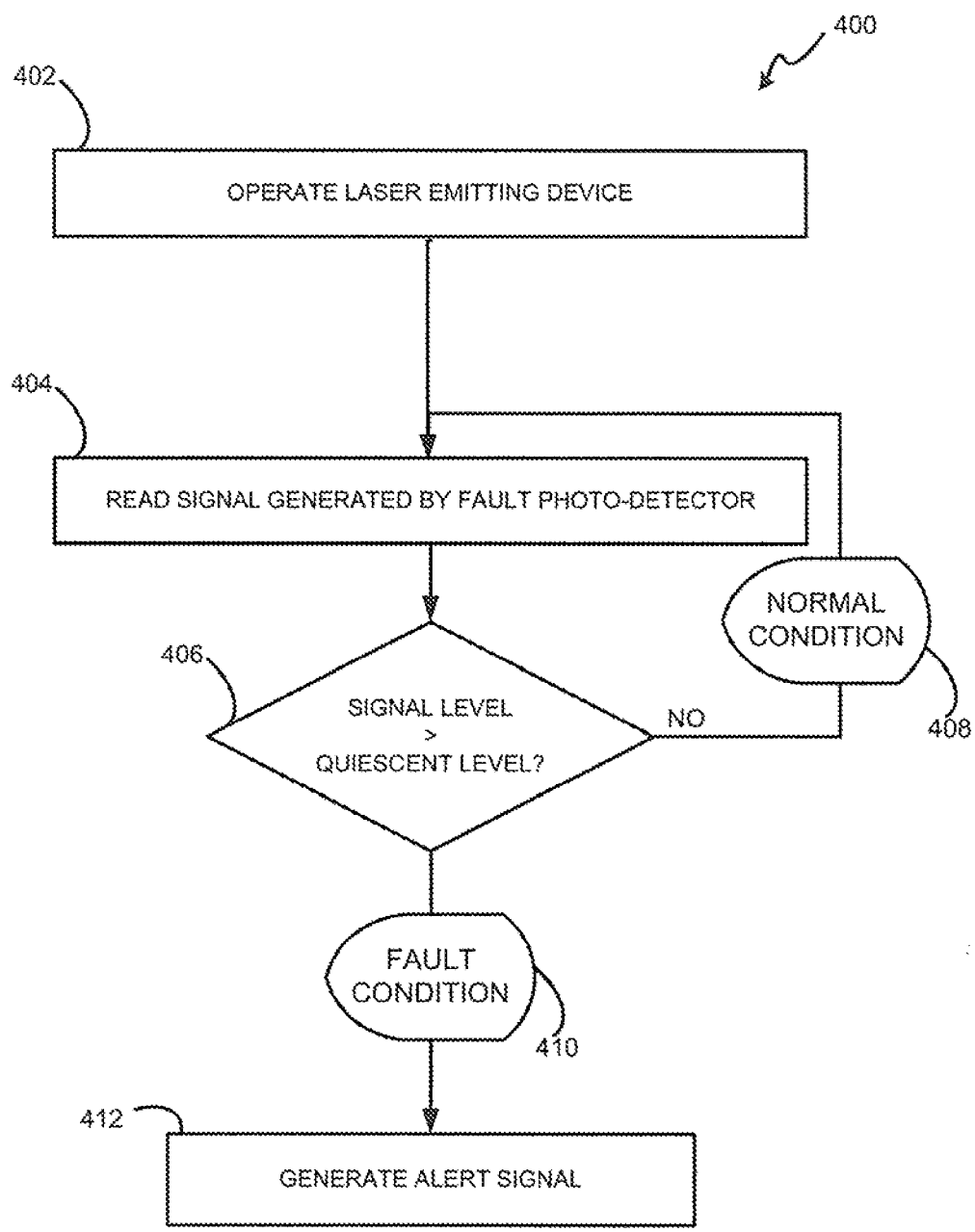
FIG. 4 is a process flow diagram implementing an example of a method for controlling a system for optical communication.

Detection of a fault condition of a system for optical communication is illustrated with respect to FIG. 4. More specifically, process flow 400 illustrates a method for operating an optical communication system such as any of systems 100, 200, or 300 in FIGS. 1A to 3.

At block 402, a laser emitting device (e.g., laser emitting device 102) is operated for generating an optical signal carrying data. Laser controller 322 may be responsible for implementing block 402. At block 404 a signal generated by a fault photo-detector (e.g., fault photo-detector 110) is read. Fault-detection module 312 may be responsible for implementing block 404. Block 404 may be implemented in a continuous manner, e.g., Fault-detection module 312 may continuous read the signal generated by fault photo-detector 306. Alternatively, block 404 may be implemented in a semi-continuous manner, e.g., at selected time intervals. Alternatively, block 404 may be implemented such that the signal generated by fault photo-detector 306 is read on-demand, e.g., during a system check or at the request of a system operator.

At block 406, the signal level read at block 404 is compared to a quiescent level. The quiescent level corresponds to a threshold value under which, the system is supposed to be in a normal condition. A quiescent level can be determined as illustrated above. If the signal level read at block 404 is lower than the quiescent level, then it is determined 408 that the system is at a normal condition. If this condition applies and block 404 is to be performed continuously or semi-continuously, process flow 400 may return to block 404 as depicted in the example of FIG. 4. Alternatively, process flow 400 may be stopped and the operator, or another component of the system, may be informed that condition of the system is normal.

If the signal level read at block 404 is higher than the quiescent level, then it is determined 410 that the system is at a fault condition. If a fault condition is determined, then an alert signal may be generated at block 412. The operator, or another component of the system, may be informed that condition of the system corresponds to a fault. Further, checking routines may be triggered for determining the cause of the accidental back-reflections as described above.

Figure 5:
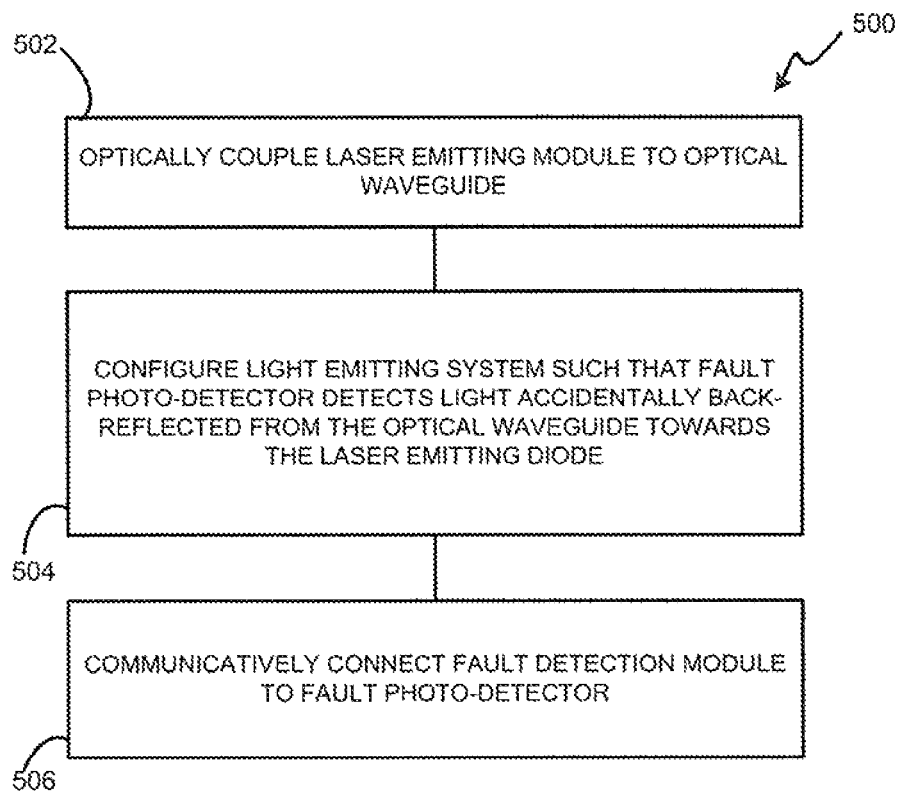
FIG. 5 is a process flow diagram implementing an example of a method for manufacturing a system for optical communication.

FIG. 5 is a process flow diagram 500 implementing an example of a method for manufacturing a system for optical communication, such as any of systems 100, 200, or 300 illustrated above with respect to FIGS. 1A to 3. At block 502, a laser emitting assembly (e.g., laser emitting device 102) is optically coupled to an optical waveguide (e.g., optical waveguide 108). The laser emitting assembly may include (i) an emission surface for emitting a laser beam (e.g., emission surface 104 of laser emitting device 102); and (ii) a fault photo-detector (e.g., fault photo-detector 110) surrounding the emission surface of the laser emitting device.

Block 502 is performed such that a laser beam emitted from the laser emission surface is coupled into the optical waveguide. Optically coupling may include integrating the laser emitting device and the optical waveguide (e.g., an optical fiber) in an optical connector with a relative geometric disposition such that the laser light is coupled into the optical waveguide. The optical connector may be implemented in an optical system for further transmitting the laser beam and, hence, the optically transmitted data.

At block 504, the system is configured such that the fault photo-detector detects light accidentally back-reflected from the optical waveguide towards the laser emitting device. Generally, block 504 includes aligning the components of the system such that only accidental back-reflections, or background light as mentioned above, is detected by the fault photo-detector. Block 504 may also include determining a quiescent level as illustrated above. More specifically, block 504 may include calibrating the system for determining a quiescent level of the fault photo-detector. The calibration is for determining that a signal from the fault photo-detector above the quiescent level is indicative of a fault condition of the system caused by light accidentally back-reflected from the optical waveguide towards the laser emitting device Flow chart 500 may include a block 506 in which a fault detection module is communicatively connected to the fault photo-detector (e.g., through an electrical connection for transmitting signal output 310, as illustrated with respect to FIG. 3). The fault detection module is to detect a fault condition of the system based on the signal generated by the fault photo-detector such as illustrated above with respect to fault detection module 312 in FIG. 3.

Figure 6A:
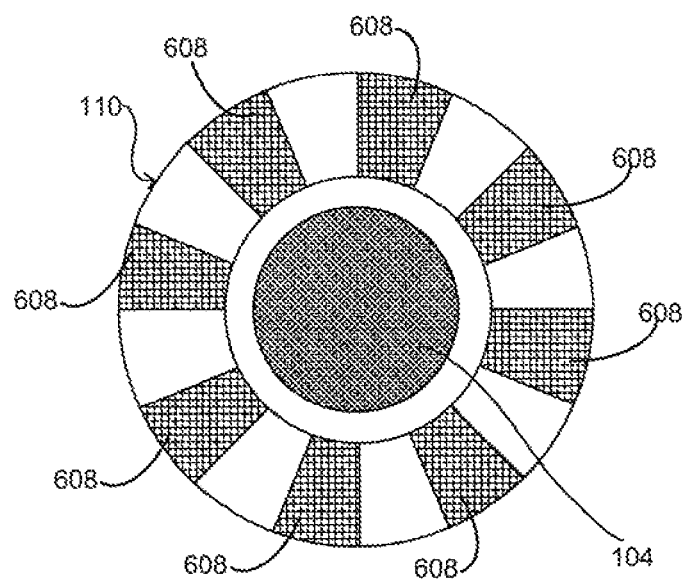
FIGS. 6A and 6B schematically show cross-sections of systems for optical communication according to other examples.
Figure 6B:
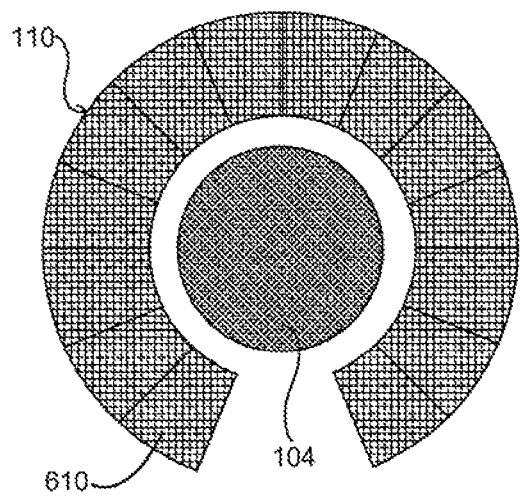

FIGS. 6A and 6B illustrate alternative manners of arranging a fault photo-detector 110 surrounding emission surface 104 of a laser emitting device according to examples herein. In the example of FIG. 6A, fault photo-detector 110 includes a set of detecting sub-modules 608 staggered around emission surface 104. This example, and the examples illustrated with respect to FIGS. 1A to 2 and 6A, show that the fault photo-detector and, more specifically, its detecting surface, may symmetrically surround the laser emitting device. Such a disposition of the fault photo-detector facilitates a reliable detection of accidental back-reflection.

According to other examples, as illustrated in FIG. 6B, fault photo-detector 110 and, more specifically, its detecting surface 610, may asymmetrically surround emission surface 104. Further, according to some examples, the fault photo-detector may partially surround the emission surface of the laser emitting device. For example, the fault photo-detector may surround at least 50% or, more specifically, at least 80% of the outer perimeter of the laser emitting device. Since in some systems the accidental back-reflections may be very scattered, a fault photodetector that partially surrounds emission surface 104 may be sufficient for detecting those reflections. A fault photo-detector partially surrounding the emission surface of the laser emitting device represents an efficient manner of detecting accidental back-reflections. A fault photo-detector completely surrounding the emission surface of the laser emitting device facilitates reliable detection of accidental back-reflections.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of one or more such elements, neither requiring nor excluding two or more such elements. Further, the terms "include" and "comprise" are used as open-ended transitions.

What is claimed is:

1. A system for optical communication, the system comprising:
    a laser emitting device including an emission surface for emission of a laser beam;
    an optical waveguide optically coupled to the laser emitting device to receive the laser beam from the laser emitting device;
    a fault photo-detector surrounding the emission surface, the fault photo-detector being to detect only that portion of the laser beam accidentally back-reflected towards the laser emitting device; and
    a monitoring photo-detector to monitor output of the laser emitting device for purposively coupling thereto a portion of laser light emitted by the laser emitting device, to identify fluctuations of output of the laser.

2. The system of claim 1, wherein the fault photo-detector surrounds at least 50% of the outer perimeter of the laser emitting device.

3. The system of claim 1, wherein the fault photo-detector symmetrically surrounds the laser emitting device.

4. The system of claim 1, wherein the fault photo-detector completely surrounds the emission surface.

5. The system of claim 1, wherein the laser emitting device includes a vertical cavity surface emitting laser (VCSEL).

6. The system of claim 1, wherein the optical waveguide includes an optical fiber.

7. The system of claim 1, wherein the monitoring photo-detector does not detect that portion of the laser beam accidentally back-reflected towards the laser emitting device.

8. A system for optical communication, the system comprising:
    a laser emitting device including an emission surface for emission of a laser beam into an optical waveguide;
    a fault photo-detector surrounding the emission surface to generate a signal output in response to only that light accidentally back-reflected towards the laser emitting device; and
    a fault detection module communicatively connected to the fault photo-detector to detect a fault condition of the system on the basis of the signal output of the fault photo-detector; and
    a monitoring photo-detector to monitor output of the laser emitting device for purposively coupling thereto a portion of laser light emitted by the laser emitting device, to identify fluctuations of output of the laser.

9. The system of claim 8, wherein the fault condition includes at least one of i) an optical misalignment between the laser emitting device and the optical waveguide, or ii) a degradation of an optical link.

10. The system of claim 8, wherein the fault condition module detects a fault condition when the signal generated by the fault photo-detector is higher than a quiescent level.

11. The system of claim 8, further including an alert module to generate an alert signal on the basis of the signal output of the fault photo-detector.

12. The system of claim 8, wherein the emission surface completely surrounds the emission surface.

13. The system of claim 8, wherein the system is further configured to, once a fault condition is detected, operating with a specific modulation the laser emitting device to confirm whether a signal output of the fault photo-detector corresponds to light from laser emitting device accidentally back-reflected towards the laser emitting device.

14. The system of claim 8, wherein the monitoring photo-detector does not detect that light accidentally back-reflected towards the laser emitting device.

15. A method of manufacturing a system for optical communication, the method comprising:
    optically coupling a laser emitting assembly to an optical waveguide for coupling a laser beam emitted from the laser emitting device into the optical waveguide, the laser emitting assembly including: (i) an emission surface for emitting a laser beam; (ii) a fault photo-detector surrounding the emission surface; and (iii) a monitoring photo-detector; and
    configuring the system such that the fault photo-detector detects only that light accidentally back-reflected from the optical waveguide towards the laser emitting device; and
    configuring the system such that the monitoring photo-detector is to monitor output of the laser emitting device for purposively coupling thereto a portion of laser light emitted by the laser emitting device, to identity fluctuations of output of the laser.

16. The method of claim 15, wherein configuring the system includes communicatively connecting a fault detection module to the fault photo-detector, the fault detection module being to detect a fault condition of the system based on the signal generated by the fault photo-detector.

17. The method of claim 15, further including calibrating the system for determining a quiescent level of the fault photo-detector, a signal from the fault photo-detector above the quiescent level being indicative of a fault condition of the system caused by light accidentally back-reflected from the optical waveguide towards the laser emitting device.

18. The method of claim 15, wherein the monitoring photo-detector does not detect that light accidentally back-reflected towards the laser emitting device.

* * * * *

UNITED STATES PATENT AND TRADEMARK OFFICE
CERTIFICATE OF CORRECTION

| | |
|---|---|
| PATENT NO. | : 9,287,988 B2 |
| APPLICATION NO. | : 14/397422 |
| DATED | : March 15, 2016 |
| INVENTOR(S) | : David A Warren |

It is certified that error appears in the above-identified patent and that said Letters Patent is hereby corrected as shown below:

Claims

In column 11, line 54, in Claim 8, delete "device; and" and insert -- device; --, therefor.

In column 12, line 41, in Claim 15, delete "identity" and insert -- identify --, therefor.

Signed and Sealed this
Twelfth Day of July, 2016

Michelle K. Lee
*Director of the United States Patent and Trademark Office*